US012479700B2

(12) United States Patent
Altenburger et al.

(10) Patent No.: US 12,479,700 B2
(45) Date of Patent: Nov. 25, 2025

(54) ELEVATOR SYSTEM HAVING TWO SHAFTS

(71) Applicant: TK Elevator Innovation and Operations GmbH, Düsseldorf (DE)

(72) Inventors: Bernd Altenburger, Neuhausen (DE); Tobias Wenzelburger, Stuttgart (DE)

(73) Assignee: TK Elevator Innovation and Operations GmbH, Düsseldorf (DE)

( * ) Notice: Subject to any disclaimer, the term of this patent is extended or adjusted under 35 U.S.C. 154(b) by 1779 days.

(21) Appl. No.: 16/611,891

(22) PCT Filed: May 4, 2018

(86) PCT No.: PCT/EP2018/061447
§ 371 (c)(1),
(2) Date: Nov. 8, 2019

(87) PCT Pub. No.: WO2018/206413
PCT Pub. Date: Nov. 15, 2018

(65) Prior Publication Data

US 2021/0139282 A1 May 13, 2021

(30) Foreign Application Priority Data

May 11, 2017 (DE) ..................... 10 2017 110 275.2

(51) Int. Cl.
*B66B 9/00* (2006.01)
*B66B 5/28* (2006.01)
*B66B 11/00* (2006.01)

(52) U.S. Cl.
CPC .................. *B66B 9/00* (2013.01); *B66B 5/28* (2013.01); *B66B 11/0005* (2013.01);
(Continued)

(58) Field of Classification Search
CPC ....... B66B 9/00; B66B 1/468; B66B 11/0095; B66B 7/08; B66B 13/20; B66B 5/28;
(Continued)

(56) References Cited

U.S. PATENT DOCUMENTS 5,651,426 A 7/1997 Bittar et al.
5,924,524 A 7/1999 Barker et al.
(Continued)

FOREIGN PATENT DOCUMENTS

CN 1160011 A 9/1997
CN 1172763 A * 2/1998 ........... B66B 1/2458
(Continued)

OTHER PUBLICATIONS

English Translation of International Search Report issued in PCT/EP2018/061447, dated Aug. 15, 2018 (mailed Sep. 13, 2018).

*Primary Examiner* — Jeffrey Donels
(74) *Attorney, Agent, or Firm* — Dinsmore & Shohl LLP

(57) ABSTRACT

An elevator system may include upper and lower shuttle cars in a first shaft. The shuttle cars are at least at times fixedly coupled to one another and can move vertically upward and downward together. Upper and lower distribution cars in a second shaft may be movable vertically upward and downward separately. The upper shuttle and upper distribution cars may each comprise a stopping point at an upper shuttle level. The lower shuttle and lower distribution cars may each comprise a stopping point at a lower shuttle level. The second shaft may include a first stop element that can selectively limit a driving range of the upper distribution car to the upper shuttle level and a range vertically above it. A second stop element in the second shaft may selectively limit a driving range of the lower distribution car to the lower shuttle level and a range vertically below it.

16 Claims, 3 Drawing Sheets

(52) U.S. Cl.
CPC ... *B66B 2201/301* (2013.01); *B66B 2201/306* (2013.01); *B66B 2201/307* (2013.01)

(58) Field of Classification Search
CPC ... B66B 1/2466; B66B 1/36; B66B 2201/306; B66B 2201/222; B66B 1/425; B66B 2201/301; B66B 2201/303; B66B 2201/307; B66B 2201/226; B66B 11/0213
See application file for complete search history.

(56) References Cited

U.S. PATENT DOCUMENTS

| | | | | |
|---|---|---|---|---|
| 2004/0173417 | A1 | 9/2004 | Jokela | |
| 2005/0077115 | A1* | 4/2005 | Urata | B66B 9/00 187/389 |
| 2008/0006485 | A1* | 1/2008 | Kocher | B66B 11/0095 187/382 |
| 2013/0118837 | A1 | 5/2013 | Altenburger | |
| 2016/0244299 | A1* | 8/2016 | Zerelles | B66B 9/00 |
| 2017/0320702 | A1 | 11/2017 | Gerstenmeyer | |

FOREIGN PATENT DOCUMENTS

| | | | | | |
|---|---|---|---|---|---|
| CN | 201343338 | Y | | 11/2009 | |
| CN | 201560031 | U | | 8/2010 | |
| CN | 102556805 | A | | 7/2012 | |
| CN | 102947209 | A | | 2/2013 | |
| CN | 101678993 | B | * | 7/2013 | B66B 1/2433 |
| CN | 203428696 | U | | 2/2014 | |
| DE | 60214219 | T | | 12/2006 | |
| DE | 102010030436 | A | | 12/2011 | |
| DE | 102017110275 | A1 | * | 11/2018 | B66B 11/0005 |
| EP | 820952 | A2 | * | 1/1998 | B66B 1/2458 |
| EP | 2 585 395 | B | | 3/2016 | |
| GB | 2320013 | A | * | 6/1998 | B66B 1/2491 |
| JP | 2004-018178 | A | | 1/2004 | |
| JP | 2012-030977 | A | | 2/2012 | |
| KR | 20100085811 | A | * | 7/2010 | |
| WO | 2004071923 | A | | 8/2004 | |
| WO | WO-2004071923 | A1 | * | 8/2004 | B66B 1/20 |
| WO | WO-2011029479 | A1 | * | 3/2011 | B66B 1/24 |
| WO | WO-2011138984 | A1 | * | 11/2011 | B66B 9/00 |
| WO | 2011161104 | A | | 12/2011 | |
| WO | WO-2018206413 | A1 | * | 11/2018 | B66B 11/0005 |

* cited by examiner

ELEVATOR SYSTEM HAVING TWO SHAFTS

CROSS REFERENCE TO RELATED APPLICATIONS

This application is a U.S. National Stage Entry of International Patent Application Serial Number PCT/EP2018/061447, filed May 4, 2018, which claims priority to German Patent Application No. DE 10 2017 110 275.2, filed May 11, 2017, the entire contents of both of which are incorporated herein by reference.

FIELD

The present disclosure generally relates to elevators, including elevator systems that include multiple shafts with multiple cars in each of the shafts.

BACKGROUND

In multi-story buildings which extend over a large number of floors, in particular in high-rise buildings, it may be required to convey a high number of persons with an elevator system over a large number of floors and to distribute them to a large number of floors. For this purpose, a system which has a plurality of elevator shafts can be advantageous in order that persons wishing to access a far-up floor can first of all be conveyed by means of a shuttle over a large number of floors, in particular without an intermediate stop, and in order that then, in a lobby, said persons are allowed to change to one or more distribution cars which convey the persons into the desired, higher-up destination floors.

Particularly as shuttles, here, a plurality of cars can be arranged vertically one above another in a shaft, said cars, for example as so-called double-decker cars, being fixedly coupled to one another and/or fixedly connected to one another and being able to be moved only together with one another.

It is also possible, in distribution elevators, for a plurality of distribution cars to be arranged vertically above one another in a shaft. The use of at least two cars which are arranged above one another in a shaft and which can be moved vertically upward and downward separately from one another makes it possible to increase the transport capacity of an elevator installation in order to convey persons and/or loads. Each car is assigned a drive device for moving the car vertically upward and vertically downward. Here, the drive device can comprise a drive motor and a drive brake. In order, in the event of a malfunction, to avoid an unbraked collision of two cars which can be moved separately from one another, the elevator installations often comprise a safety device by means of which the driving behavior of the cars can be monitored and, if required, an emergency stop can be triggered. In the event of an emergency stop, the drive motor of the car is switched off and the drive brake is activated. In addition, each car can have arranged thereon a brake device, for example an arresting device, by means of which the car can be mechanically braked upon undershooting a safety distance from an adjacent car. In addition, a travel path-limiting device is customarily used for the lowermost car. The travel path-limiting device allows the travel path of the lowermost car to be limited and a collision of the lowermost car with underlying parts of the elevator installation or of the shaft pit to be damped. Here, the holding element is customarily designed in the form of a buffer element which is arranged within the vertical projection of the lowermost car in the shaft pit.

For example, document EP 2 585 395 B1 discloses an elevator installation which comprises a plurality of cars in a shaft which can be moved separately from one another.

DETAILED DESCRIPTION

Figure 1:
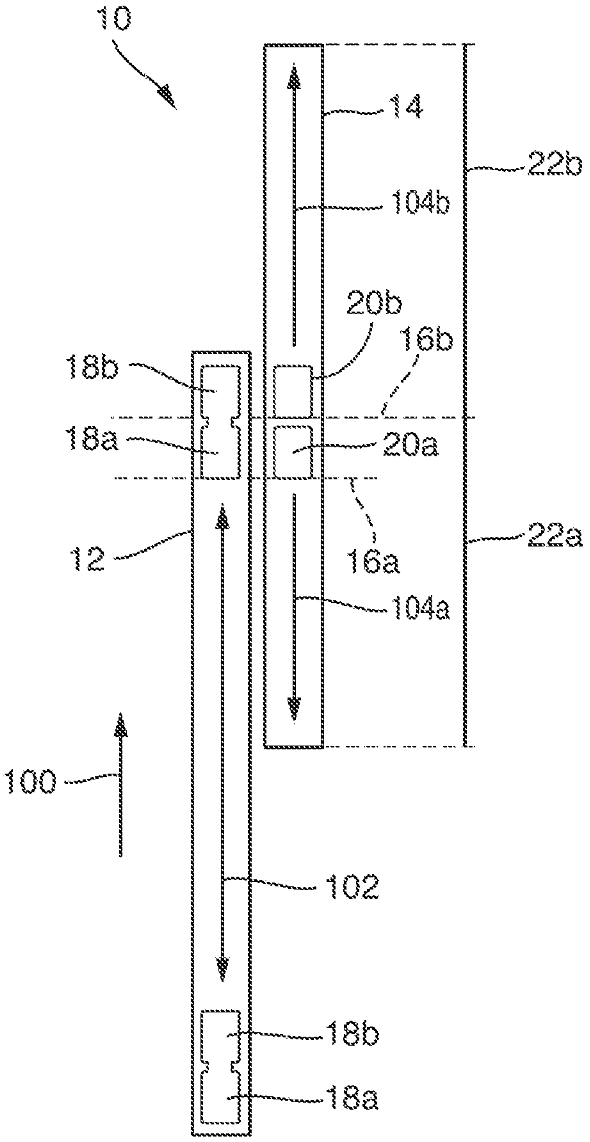
FIG. 1 is a schematic view of an example elevator system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In a first aspect, the invention relates to an elevator system having a first shaft in which at least one upper shuttle car and at least one lower shuttle car are arranged above one another and, at least at times, are fixedly coupled to one another and can be moved vertically upward and vertically downward together. Furthermore, the elevator system comprises a second shaft in which at least one upper distribution car and at least one lower distribution car are arranged above one another and can be moved vertically upward and vertically downward separately from one another. The elevator installation is designed in such a way that the upper shuttle car and the upper distribution car each comprise a stopping point at an upper shuttle level, and the lower shuttle car and the lower distribution car each comprise a stopping point at a lower shuttle level. Furthermore, the second shaft comprises at least one first stop element which is designed to limit, at least at times, a driving range of the upper distribution car to the upper shuttle level and to a range vertically above the upper shuttle level, and a second stop element which is designed to limit a driving range of the lower distribution car, at least at times, to the lower shuttle level and to a range vertically below the lower shuttle level.

The invention affords the advantage that at least two distribution cars can be provided in a shaft and comprise separate driving ranges which are separated from one another. In particular, the driving range of the upper distribution car can extend vertically upward from the upper shuttle level, whereas the driving range of the lower distribution car extends vertically downward from the lower shuttle level. In this way, the upper distribution car and the lower distribution car can be operated simultaneously in a shaft without them impeding one another. For example, the lower distribution car does not have to wait to commence travel until the upper distribution car has been set in movement, and vice versa. It is thus possible to avoid unnecessary waiting times of the distribution cars, with the result that an increase in efficiency of the elevator system can be achieved.

Moreover, the invention affords the advantage that it is not absolutely necessary to provide a separate collision prevention device which monitors the driving movements of the upper distribution car and of the lower distribution car in order, where appropriate, to promptly recognize a risk of collision of the two distribution cars and, where necessary, to brake and/or to stop the distribution cars. If the elevator system is designed in such a way that the upper distribution car and the lower distribution car comprise driving ranges which are separated from one another or do not overlap, a risk of collision of the two distribution cars can be avoided even though they move toward one another in the same shaft, since the driving ranges of the upper distribution car and of the lower distribution car do not overlap one another and thus there is no risk of collision. The invention thus affords the advantage that the elevator system can be simplified and/or is more cost-effective to manufacture, since, where appropriate, a complicated collision prevention device can be dispensed with.

In addition, the invention affords the advantage that a floor spacing between two stopping points arranged above one another, in particular the floor spacing between the upper shuttle level and the lower shuttle level, can be reduced by comparison with conventional elevator systems in which two distribution cars can be moved separately from one another in the same shaft. The minimum floor spacing is typically imposed by safety spacings to be maintained between two cars in the same shaft which move toward one another, in order for instance to reduce the risk of collisions of the distribution cars and/or to lessen the acting forces in the event of a collision. In particular, the safety spacing at least to be maintained between two cars moving toward one another is determined by a reaction time of a safety controller or of a collision prevention unit, which thus also imposes a minimum floor spacing. Since, however, according to the invention, if the driving ranges of the upper distribution car and of the lower distribution car are separated from one another by the stop elements such that they do not overlap one another, the lower distribution car can in any case not penetrate into the driving range of the upper distribution car, and vice versa, the required safety spacing between the two driving ranges and thus between the upper shuttle level and the lower shuttle level can be reduced. The result of this is that the floor spacing between the lower shuttle level and the upper shuttle level can also be reduced. The smaller floor spacing can result in a cost saving since no unnecessary high room heights have to be provided in the region of the lower shuttle level and/or the upper shuttle level, in which, for example, a lobby can be formed, and thus the building for which the elevator system is provided can comprise a smaller height, or the space saved can be planned or used in some other way. In addition, the reduced floor spacing can also afford an architectural advantage since, by virtue of the lower minimum floor spacing, there can occur architectural freedoms which in turn can offer freedoms in the design of the building. For example, a lobby region around the upper and lower shuttle level with a lower room height and/or a smaller floor spacing can be perceived to be more esthetic than lobby regions with a conventional, higher floor spacing.

The shuttle car here refers to a car which is arranged so as to be movable in the first shaft irrespective of whether the shuttle car is actually designed or is used to serve as a shuttle. Preferably, however, a shuttle car serves to convey persons and/or loads from a starting floor to a shuttle level. With particular preference, the elevator system is designed in such a way that the shuttle cars stop at no or only at few stopping points between the starting floor and the destination floor, which is preferably situated at the upper or lower shuttle level. For example, the elevator system can be designed such that the shuttle cars allow the largest possible number of persons and/or loads to be transported from the starting floor in the shortest possible time to the upper and/or lower shuttle level, and vice versa. For example, it is possible for this purpose for the upper shuttle car and the lower shuttle car, at least at times, to be coupled to one another and/or mechanically connected to one another in order to increase the transport capacity in the first shaft, with the result that, if the upper and the lower shuttle car are fixedly coupled to one another, the possibility of the plurality of shuttle cars impeding one another in the first shaft can be reduced and/or avoided. Here, the starting floor can be arranged vertically above or below the shuttle level.

Here, the upper shuttle level and/or the lower shuttle level are/is preferably a plane at which both at least one of the shuttle cars in the first shaft and at least one of the shuttle cars in the second shaft comprise a stopping point. This allows conveyed persons to change from a shuttle car to a distribution car, and/or vice versa, and/or allows a transfer of loads from a shuttle car to a distribution car, and/or vice versa. Here, a shuttle level must not necessarily be formed as a plane in the geometric sense. In particular, a stopping point of one of the distribution cars and a stopping point of one of the shuttle cars can be referred to as being arranged on the upper or lower shuttle level even though they are each arranged at a, preferably slightly, different vertical height and, for example, a change in the height must be negotiated by means of steps and/or ramps in order to pass from one of the shuttle cars into one of the distribution cars, or vice versa.

The distribution car here refers to a car which is arranged so as to be movable in the second shaft even though said car is not necessarily responsible for the function of distribution. Preferably, however, a distribution car serves to convey persons and/or loads from the upper shuttle level and/or the lower shuttle level in the second shaft to a desired destination floor. Here, the destination floor can be arranged vertically above or below the upper or lower shuttle level. The second shaft preferably comprises an upper portion and a lower portion, wherein the upper portion comprises the upper shuttle level and the region vertically above the upper shuttle level, and wherein the lower portion comprises the lower shuttle level and the region vertically below the lower shuttle level. With particular preference, the upper portion and the lower portion are designed to be the same size, wherein the upper shuttle level and/or the lower shuttle level are/is arranged in the vertical direction substantially in the center of the second shaft. This affords the advantage that the lower and the upper distribution car can comprise driving ranges which are approximately of the same size and are separated from one another and can preferably serve an identical number of floors, wherein, starting from the upper shuttle level, the upper distribution car serves only a region above and, starting from the lower shuttle level, the lower distribution car serves only a region below.

The fact that the driving ranges of the upper distribution car and/or of the lower distribution car are limited, at least at times, by one of the stop elements means here that the respective driving ranges are not necessarily always, that is to say at all times, limited by one of the stop elements. For example, the stop elements can be designed to be movable in such a way that they limit the respective driving ranges in a first position or in a first state or in a first orientation, but do not limit the respective driving ranges in another position or in another state.

The elevator system is preferably designed such that the stopping point at the upper shuttle level can be driven to by the upper distribution car and simultaneously the stopping point at the lower shuttle level can be driven to by the lower distribution car if the driving range of the upper distribution car is limited to the upper shuttle level and to the range vertically above the upper shuttle level and the driving range of the lower distribution car is limited to the lower shuttle level and to the range vertically below the lower shuttle level. In particular, the driving range of the upper distribution car can end at its lower end at the upper shuttle level, whereas the driving range of the lower distribution car ends at its upper end at the lower shuttle level. The result of this is that the lower distribution car cannot move to the upper shuttle level and to the region above the upper shuttle level, and the upper distribution car cannot move to the lower shuttle level and to the region below the lower shuttle level. In this way, the driving ranges of the upper and lower distribution car are limited and separated from one another in such a way that the separation or limitation extends between the upper and the lower shuttle level. Consequently, the lower distribution car can serve the region of the lower shuttle level and below, whereas the upper distribution car can serve the region of the upper shuttle level and above, without the upper and the lower distribution car impeding one another. This has the advantage that the risk of collision between the upper and lower distribution car can be reduced or avoided in a particularly efficient and/or secure manner. Furthermore, this affords the advantage that the upper and the lower distribution car can be used independently of one another, and as a result unnecessary waiting times for the movement of the distribution cars can be avoided.

The uppermost stopping point in the first shaft is preferably arranged at the upper shuttle level. With particular preference, the stopping point is arranged directly below the uppermost stopping point in the first shaft at the lower shuttle level. In other words, the two uppermost stopping points of the shuttle cars in the first shaft are arranged at the upper and the lower shuttle level. In particular, the first shaft extends upwardly in the vertical direction in such a way that the uppermost stopping point is situated at the upper shuttle level. This affords the advantage that the maximum height of the first shaft can be utilized by the shuttle cars in order to convey persons and/or loads from a lower starting floor to the upper and lower shuttle level.

The first stop element is preferably designed to limit the driving range of the upper distribution car by means of a mechanical contact with the upper distribution car and/or by means of a mechanical contact with a counterweight of the upper distribution car, and/or the second stop element is preferably designed to limit the driving range of the lower distribution car by means of a mechanical contact with the lower distribution car and/or by means of a mechanical contact with a counterweight of the lower distribution car. This affords the advantage that the driving range of the upper and/or lower distribution car can be reliably limited since a driving movement of the upper and/or lower distribution car beyond the driving range limitation is prevented by mechanical means. As a result, a simple and/or cost-effective driving range limitation can be provided. Furthermore, a driving range limitation by means of mechanical contact can also provide a particularly reliable driving range limitation which is not susceptible to disturbances or is so to only a small degree. The driving range limitation by mechanical means also requires no reaction time and thus no resultant higher floor spacing.

Here, a driving range limitation of the upper and/or lower distribution car by means of a mechanical contact with the counterweight of the respective distribution car affords the advantage that the stop element does not necessarily have to be arranged in the surroundings of the driving range limit but can be arranged far away from the driving range limit of the respective distribution car, for example close to the shaft pit or close to the shaft ceiling, where, for example, the counterweight is situated when the respective distribution car reaches the driving range limit. A blocking of the counterweight by means of a stop element can here be substantially equivalent to a direct blocking of the distribution car by means of a stop element, since a blocking of the counterweight also does not result in a further propulsion of the car. There only needs to be borne in mind that, during an upward movement of the distribution car in which the driving range limitation occurs by means of a blocking of the downward movement of the counterweight with a stop element, the car continues the upward movement under certain circumstances for a short distance on account of the remaining kinetic energy and then falls back again, and thus possibly "jumps" beyond the set driving range limitation. This may need, where appropriate, to be taken into consideration when determining the required safety spacings between the driving ranges of the different distribution cars.

A driving range limitation by means of a stop element for blocking the counterweight can further afford the advantage that the minimum spacing, and preferably the minimum floor spacing, between the two distribution cars can be reduced since, where appropriate, no space has to be provided there for a stop element for providing a direct mechanical contact with the distribution car.

The first stop element and/or the second stop element are/is preferably designed to be movable such that the first stop element and/or the second stop element can be moved between a release position, in which the driving range of the upper distribution car or of the lower distribution car is not limited by the respective stop element, and a stop position, in which the driving range of the upper distribution car or of the lower distribution car is limited by the respective stop element. This has the advantage that the driving range limitations can be dynamically determined and/or removed and/or varied. For example, it can thus be made possible that the driving ranges of the upper and of the lower distribution car are limited and delimited from one another only when the upper and the lower distribution car move toward one another. For example, the driving ranges can also be expanded and/or restricted. For example, a movable stop element allows floors and/or regions to be excluded from the driving range of one of the distribution cars or both distribution cars and to be included again.

The upper distribution car and/or the lower distribution car preferably respectively have/has a holding element which is designed in such a way that a mechanical contact between the holding element and the first stop element or the second stop element limits the driving range of the upper distribution car or the driving range of the lower distribution car. This affords the advantage that the stop element does not have to come into direct mechanical contact with other components of the respective distribution car. For example, the holding element can be designed in such a way that, in a vertical projection, it does not overlap with the other components of the distribution car but only overlaps with a holding element arranged on the distribution car. It is possible in this way, by means of a suitable arrangement of the stop element and/or of the holding element, to ensure that a stop element comes into mechanical contact only with a certain distribution car or with its holding element and thus limits only the driving range of this distribution car.

The holding element is preferably designed to be movable such that the holding element can be moved between a release position, in which the driving range of the respective distribution car is not limited by the holding element, and a stop position, in which the driving range of the respective distribution car is limited by the holding element. This affords the advantage that, where appropriate, no movable stop element has to be provided for a dynamic or variable driving range limitation, but the dynamic driving range limitation can be achieved by means of the holding element.

The first shaft and the second shaft are preferably formed parallel to one another and preferably arranged adjoining one another and/or the first shaft and the second shaft at least partially overlap in the vertical direction. However, the first shaft and the second shaft do not necessarily have to extend or be formed directly next to one another. For example, the first and the second shaft can also be formed in different parts of a building.

The elevator installation is preferably designed in such a way that the upper shuttle car and the lower shuttle car are permanently fixedly coupled to one another and/or permanently mechanically connected to one another. This makes it possible, for example, for the upper and the lower shuttle car to be permanently prevented from impeding one another. This can have the advantage that additional technical devices which can serve to prevent the lower and the upper shuttle car from impeding one another do not necessarily have to be provided, since the upper and the lower shuttle car can in any case be moved or displaced only together in the shaft. The elevator system is preferably designed in such a way that the shuttle cars are operated as a double-decker elevator installation or the upper shuttle car and the lower shuttle car are designed as double-decker cars which are permanently fixedly coupled to one another.

It will be understood that the features mentioned above and those still to be explained below can be used not only in the respectively indicated combination but also in other combinations or on their own without departing from the scope of the present invention.

FIG. 1 shows in a schematic illustration an elevator system 10 according to a first preferred embodiment. The elevator system 10 comprises a first shaft 12 and a second shaft 14 which are arranged next to one another and extend parallel to one another in the vertical direction 100. The first shaft 12 extends vertically further downward than the second shaft 14, the second shaft extending vertically further upward than the first shaft 12. The first shaft 12 and the second shaft 14 overlap in a central region, that is to say they extend parallel next to one another over a vertical portion. In particular, both the first shaft 12 and the second shaft 14 extend as far as a lower shuttle level 16*a* and an upper shuttle level 16*b* or beyond.

A lower shuttle car 18*a* and an upper shuttle car 18*b* are provided in the first shaft 12 and can be moved vertically upward and downward in the first shaft 12, as is illustrated by arrow 102. Here, the lower shuttle car 18*a* and the upper shuttle car 18*b* are, at least at times, fixedly coupled to one another in that they are mechanically fixedly connected to one another, for example. Consequently, the lower shuttle car 18*a* and the upper shuttle car 18*b*, if they are fixedly coupled to one another, can be moved only together, but not separately from one another, that is to say can be operated as double-decker cars.

According to the embodiment shown, the lower shuttle car 18*a* and the upper shuttle car 18*b* each comprise a stopping point both at the lower end of the first shaft 12, that is to say in the shaft pit, and at the upper end of the first shaft 12, that is to say at the shaft ceiling. Here, the stopping point of the upper shuttle car 18*b* is always arranged vertically above the corresponding stopping point of the lower shuttle car 18*a*. According to the preferred embodiment shown, the two shuttle cars 18*a* and 18*b* only each comprise a stopping point at the lower end and at the upper end of the first shaft 12, but not in the intermediate region of the first shaft 12. As a result, the first shaft 12 and the two shuttle cars 18*a* and 18*b* can be particularly well-suited as a shuttle which particularly comprises the function of conveying persons and/or loads from a lower starting floor at the lower end of the first shaft 12 to the lower shuttle level 16*a* and/or the upper shuttle level 16*b*, and vice versa. Even though in each case two lower shuttle cars 18*a* and upper shuttle cars 18*b* are illustrated in the first shaft 12, only one lower shuttle car 18*a* and one upper shuttle car 18*b* are arranged in the first shaft 12, the further illustrated examples merely being intended to illustrate the movability of the two shuttle cars 18*a* and 18*b*.

In the second shaft 14, there are arranged a lower distribution car 20*a* and an upper distribution car 20*b* which are not coupled to one another and in particular are not mechanically fixedly connected to one another, with the result that the lower distribution car 20*a* and the upper distribution car 20*b* can be moved separately or separated from one another. According to the first preferred embodiment, the driving range 22*a* of the lower distribution car 20*a* and the upper driving range 22*b* of the upper distribution car 20*b* are limited, with the result that neither the lower distribution car 20*a* nor the upper distribution car 20*b* is movable over the entire height or length of the second shaft 14. According to the first preferred embodiment, these driving range limitations of the driving ranges 22*a* and 22*b* are set up permanently, with the result that the driving range limitations exist at all times. Here, the upper driving range 22*b* comprises the upper shuttle level 16*b* and extends vertically upward from the upper shuttle level 16*b* as far as the upper end of the second shaft 14, as illustrated by arrow 104*b*. The lower driving range 22*a* comprises the lower shuttle level 16*a* and extends vertically downward from the lower shuttle level 16*a* as far as the lower end of the second shaft 14, as illustrated by arrow 104*a*. The driving ranges 22*a* and 22*b* are thus separated from one another and do not overlap one another. In this way, a risk of a collision between the upper distribution car 20*b* and the lower distribution car 20*a* can be reduced and/or avoided in a reliable and efficient manner without there necessarily having to be provided a complicated collision prevention device which would entail considerable additional costs. Furthermore, according to the first preferred embodiment, the elevator system 10 affords the advantage that the upper distribution car 20*b* and the lower distribution car 20*a* can be moved independently of one another, with the result that unnecessary waiting times can be avoided.

Figure 2:
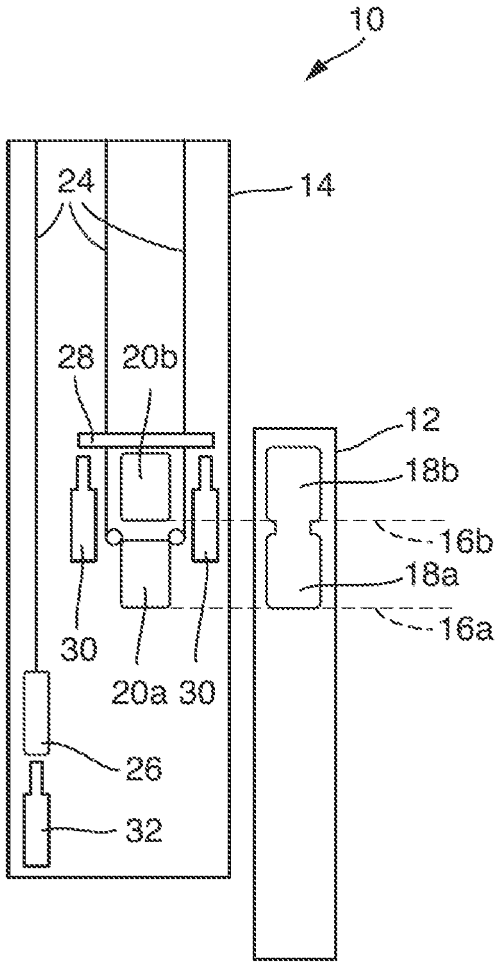
FIG. 2 is a schematic view of another example elevator system.

FIG. 2 shows in a schematic illustration a second preferred embodiment of an elevator system 10 in which the driving range limitations are explained more precisely. According to the second embodiment, at least the lower distribution car 20*a* is mechanically connected to a counterweight 26 by means of suspension elements 24. The suspension elements 24 can for example take the form of suspension ropes and/or suspension belts. At the upper end of the second shaft 14, the suspension elements can preferably run over one or more guide rollers and/or over one or more drive pulleys (not shown) in order to set the lower distribution car 20*a* and the counterweight 26 in movement. It goes without saying that the upper distribution car 20*b* and/or the shuttle cars 18*a* and 18*b* can be mechanically connected to suspension elements and/or a counterweight even though they are not illustrated for the sake of clarity.

To realize the driving range limitation of the upper driving range 22*b* of the upper distribution car 20*b*, the upper distribution car 20*b* comprises at least one holding element 28, and the second shaft 14 comprises at least one, preferably at least two, stop element 30 or stop elements 30. The stop elements 30 and/or the at least one holding element 28 can be designed to be rigidly or fixedly mounted in order, for example, to realize a permanent driving range limitation of the upper distribution car 20*b*. Alternatively, the stop elements 30 and/or the at least one holding element 28 can be designed to be movable, such as, for instance, pivotable and/or rotatable, and/or displaceable, in order, for example, to realize a dynamic or variable driving range limitation.

The holding element 28 and the stop elements 30 here are preferably designed in such a way that they come mechanically into contact with one another when the upper distribution car 20*b* reaches the end of the upper driving range 22*b* that is defined by the stop elements 30, and thus prevent a continuation of a driving movement of the upper distribution car 20*b* and a leaving of the upper driving range 22*b*. The stop elements 30 are preferably arranged in the second shaft 14 in such a way that they do not come into contact with other cars which are not intended to be influenced by the stop elements, such as, for example, with the lower distribution car 20*a*, when the respective cars approach or travel past the stop elements 30, if their driving ranges allow this.

According to the second preferred embodiment, the stop elements 30 are arranged in the second shaft 14 and the holding element 28 is arranged on the upper distribution car 20*b* in such a way that the upper distribution car 20*b* cannot move vertically downward further than to the upper shuttle level 16*b*. Consequently, the driving range of the upper distribution car 20*b* is downwardly limited in an efficient and reliable manner, with the result that a collision between the upper distribution car 20*b* and the lower distribution car 20*a* can be avoided, the driving range of which lower distribution car already begins directly below the upper shuttle level 16*b*.

It is advantageous if the at least one holding element 28 and/or at least one of the stop elements 30 comprises/comprise a buffer element which is designed to damp an impact of the holding element 28 or of the respective car on the stop element. The buffer element can, for example, damp the impact in that it absorbs and/or dissipates at least some of the impact energy. The buffer element can be designed, for example, as a hydraulic buffer and/or as an elastomer buffer. The buffer element is advantageously plastically and/or elastically deformable.

Also formed in the second shaft 14 is a further stop element 32 which serves to come into mechanical contact with the counterweight 26 of the lower distribution car 20*a* in order to limit the driving range of the lower distribution car 20*a*. In particular, the stop element 32 is designed in such a way that it prevents a movement of the counterweight 26 further vertically downward in the direction of the shaft pit, with the result that, at the same time, a further movement of the lower distribution car 20*a* vertically upward is prevented. In this way, the lower driving range 22*a* of the lower distribution car 20*a* is limited upwardly, with the result that the lower distribution car 20*a* cannot move beyond the lower shuttle level 16*a* and, in particular, cannot penetrate into the above-lying upper driving range 22*b* of the upper distribution car 20*b*.

Figure 3:
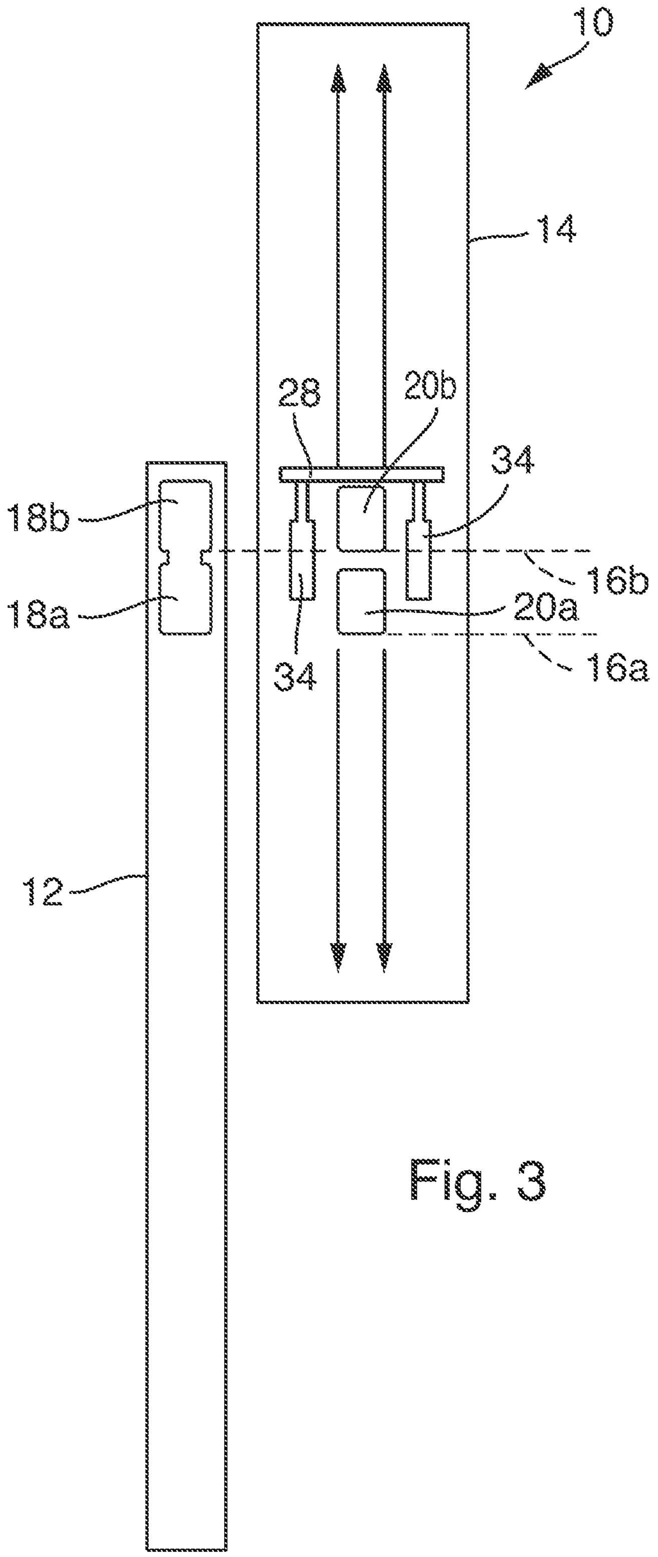
FIG. 3 is a schematic view of still another example elevator system.

FIG. 3 shows in a schematic illustration an elevator system 10 according to a third preferred embodiment. According to the third preferred embodiment, the stop elements are designed as movable stop elements 34. The movable stop elements 34 are designed to come mechanically into contact with the holding element 28 of the upper distribution car 20*b* in order to limit the upper driving range 22*b* of the upper distribution car 20*b* temporarily or at times. Here, the movable stop elements 34 are movable into a stop position and a release position. When the stop elements 34 are brought into the stop position, they are positioned and/or oriented in such a way as to come into mechanical contact with the holding element 28 and to downwardly limit the upper driving range 22*b* of the upper distribution car 20*b*. If, by contrast, the stop elements 34 are brought into the release position, they are positioned and/or oriented so as not to come into mechanical contact with the holding element 28 if the upper distribution car 20*b* travels past the position of the movable stop elements 34 and so as correspondingly not to downwardly limit the upper driving range 22*b* of the upper distribution car 20*b*.

This can be advantageous for example in order to downwardly limit the driving range of the upper distribution car 20*b* only when the upper distribution car 20*b* is intended to move into a stopping point which is situated close to the current position of the lower distribution car 20*a* and therefore measures for collision prevention have to be taken. If, by contrast, the lower distribution car 20*a* and the upper distribution car 20*b* are far away from one another in the second shaft 14, measures for collision prevention may be unnecessary and therefore a driving range limitation of the upper distribution car 20*b* and/or of the lower distribution car 20*a* may also be unnecessary.

This embodiment here affords the advantage that both distribution cars 20*a* and 20*b* can, if required, serve virtually the entire shaft and are not permanently restricted to a limited driving range. If, by contrast, the upper distribution car 20*b* is intended to move from above into the upper shuttle level 16*b* while at the same time the lower distribution car 20*a* stops in the lower shuttle level 16*a*, the movable stop elements 34 are brought into the stop position in order to take the required measures for collision avoidance.

However, according to this embodiment shown, it would not be possible without further safety measures to move the lower distribution car 20*a*, whose driving range is not limited, into the lower shuttle level 16*a* while the upper distribution car 20*b* stops in the upper shuttle level 16*b*, since otherwise no effective protection from collisions would be ensured.

It will be understood that, in another embodiment, the holding element 28 and the movable stop elements 34 can also be designed so as to limit the driving range of the lower distribution car 20*a* instead of the driving range of the upper distribution car 20*b*. In this case, a movement of the lower distribution car 20*a* into the lower shuttle level 16*a* would be possible, but not the corresponding movement of the upper distribution car 20*b* into the upper shuttle level 16*b*.

Figure 4:
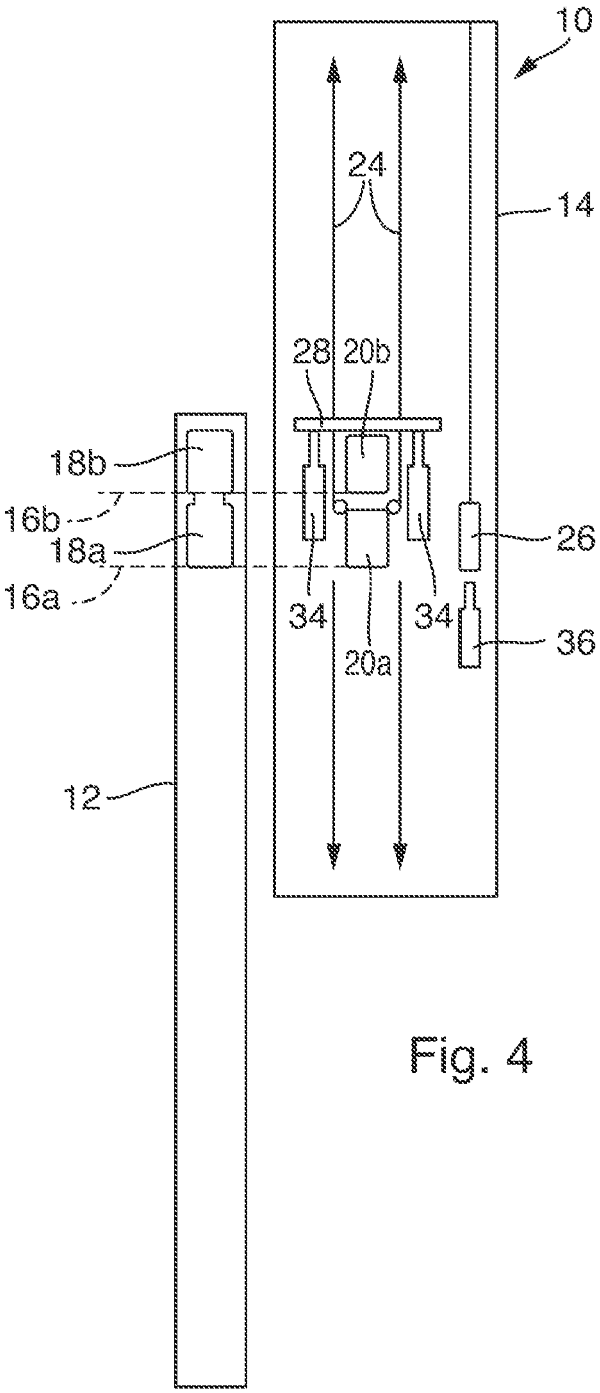
FIG. 4 is a schematic view of yet another example elevator system.

FIG. 4 shows in a schematic illustration an elevator system 10 according to a fourth preferred embodiment in which, as also in the third preferred embodiment, movable stop elements 34 are formed in order to downwardly limit the driving range of the upper distribution car 20*b,* and in addition a movable stop element 36 is formed in order to come into mechanical contact with the counterweight 26 of the lower distribution car 20*a* and thus to upwardly limit the driving range of the lower distribution car 20*a*. If both the movable stop elements 34 and the movable stop element 36 are brought into the stop position, the driving ranges of the two distribution cars 20*a* and 20*b* are limited and separated from one another, with the result that the upper distribution car 20*b* can move into the upper shuttle level 16*b* and/or can stop there, whereas the lower distribution car 20*a* can move into the lower shuttle level 16*a* and/or can stop there, without there being a collision risk. If the two distribution cars 20*a* and 20*b* are moved at a large distance from one another, the movable stop elements 34 and the movable stop element 36 can be brought into the release position, with the result that the driving range limitations are removed and the two distribution cars 20*a* and 20*b* can serve virtually the entire shaft.

Furthermore, there can be provided in the second shaft 14, at a plurality of vertical positions, corresponding movable stop elements 34 and movable stop elements 36 in order to limit the driving ranges of the two distribution cars 20*a* and 20*b* at a plurality of vertical positions so as, for instance, to allow the two distribution cars 20*a* and 20*b* to move simultaneously at different vertical positions into mutually adjoining stopping points with reduced floor spacing.

Figure 5:
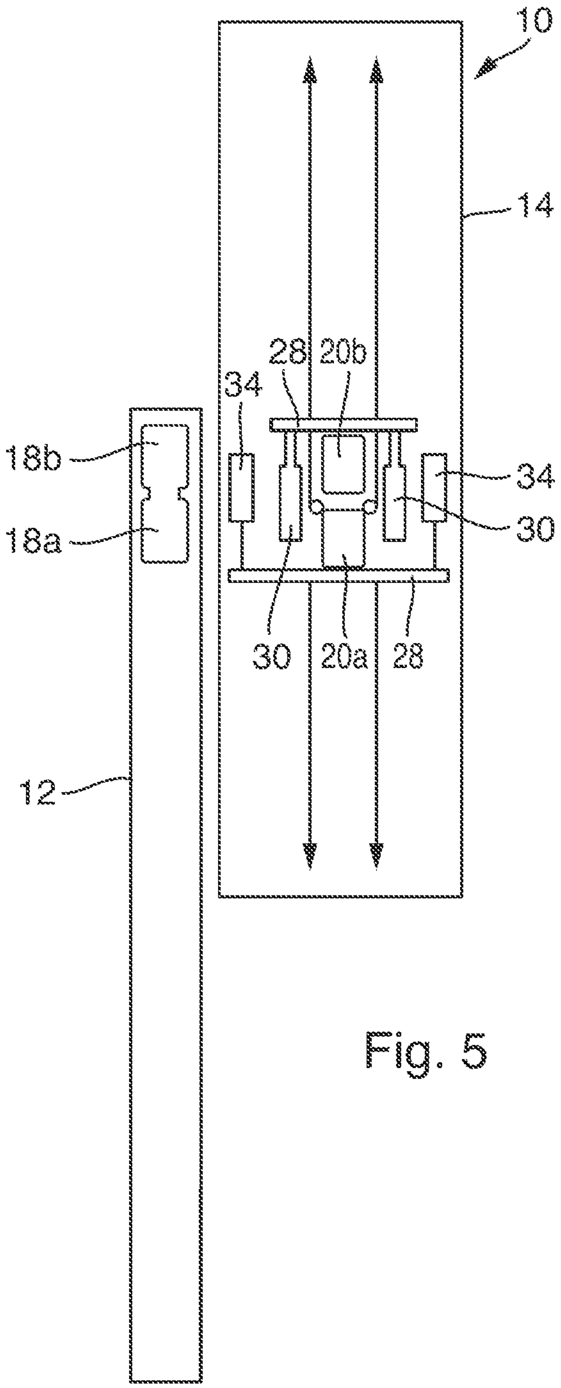
FIG. 5 is a schematic view of a yet further example elevator system.

FIG. 5 shows in a schematic illustration a fifth preferred embodiment of an elevator system 10. It substantially corresponds to an elevator system 10 according to the fourth preferred embodiment and differs from the preferred embodiment shown in FIG. 4 in that the driving range limitation of the lower distribution car 20*a* in the upward direction is not brought about by a movable stop element 36 for limiting the movement of the counterweight 26 but by a holding element 28 formed on the lower distribution car 20*a* and additionally by movable stop elements 34 which are formed in the second shaft 14 and which are designed to come into mechanical contact with the holding element 28 of the lower distribution car 20*a*.

According to a further preferred embodiment, there can be provided not only a corresponding holding element 28 and stop elements 30 and 34 provided therefor on the respective distribution car but also a stop element 32 or 36 for limiting the movement of the respective counterweight 26 of the distribution car. This can achieve, for example, a particularly reliable collision protection, since a distribution car 20*a* or 20*b* is doubly safeguarded against leaving the limited driving range.

It will be understood that, according to other embodiments, the movable stop elements 34 and 36 can also be designed to be rigid or immovable and, instead, the corresponding holding elements 28 are designed to be movable, in order to achieve a dynamic or variable driving range limitation.

REFERENCE SIGNS

10 Elevator system
12 First shaft
14 Second shaft
16*a* Lower shuttle level
16*b* Upper shuttle level
18*a* Lower shuttle car
18*b* Upper shuttle car
20*a* Lower distribution car
20*b* Upper distribution car
22*a* Lower driving range
22*b* Upper driving range
24 Suspension element
26 Counterweight
28 Holding element
30 Stop element
32 Stop element (for counterweight)
34 Movable stop element
36 Movable stop element (for counterweight)
100 Vertical direction
102 Movement direction of the shuttle cars
104*a* Movement direction of the lower distribution car
104*b* Movement direction of the upper distribution car

What is claimed is:

1. An elevator system comprising:

a first shaft in which an upper shuttle car is disposed above a lower shuttle car, wherein at least at times the upper and lower shuttle cars are fixedly coupled to one another and are only movable vertically upward and vertically downward together;

a second shaft in which an upper distribution car is disposed above a lower distribution car, wherein the upper and lower distribution cars are movable vertically upward and vertically downward separately from one another, wherein the upper shuttle car and the upper distribution car each comprise a stopping point at an upper shuttle level, wherein the lower shuttle car and the lower distribution car each comprise a stopping point at a lower shuttle level, wherein the second shaft comprises:

a first stop element that is configured to limit at least at times a driving range of the upper distribution car to the upper shuttle level and to a range vertically above the upper shuttle level, and a second stop element configured to limit at least at times a driving range of the lower distribution car to the lower shuttle level and to a range vertically below the lower shuttle level, wherein the first stop element and/or the second stop element are configured to be movable such that the first stop element and/or the second stop element are movable between a release position and a stop position, wherein in the release position the driving range of the upper distribution car or of the lower distribution car is not limited by the respective stop element, wherein in the stop position the driving range of the upper distribution car or of the lower distribution car is limited by the respective stop element via a mechanical contact with the respective stop element.

2. The elevator system of claim 1 wherein the stopping point at the upper shuttle level is reachable by the upper distribution car and the stopping point at the lower shuttle level is reachable by the lower distribution car when the driving range of the upper distribution car is limited to the upper shuttle level and to the range vertically above the upper shuttle level and the driving range of the lower distribution car is limited to the lower shuttle level and to the range vertically below the lower shuttle level.

3. The elevator system of claim 1 wherein an uppermost stopping point in the first shaft is disposed at the upper shuttle level.

4. The elevator system of claim 3 wherein the stopping point directly below the uppermost stopping point in the first shaft is disposed at the lower shuttle level.

5. The elevator system of claim 1 wherein the first stop element is configured to limit the driving range of the upper distribution car by way of mechanical contact with the upper distribution car and/or by way of mechanical contact with a counterweight of the upper distribution car.

6. The elevator system of claim 5 wherein the second stop element is configured to limit the driving range of the lower distribution car by way of mechanical contact with the lower distribution car and/or by way of mechanical contact with a counterweight of the lower distribution car.

7. The elevator system of claim 1 wherein the second stop element is configured to limit the driving range of the lower distribution car by way of mechanical contact with the lower distribution car and/or by way of mechanical contact with a counterweight of the lower distribution car.

8. The elevator system of claim 1 wherein the upper distribution car and/or the lower distribution car respectively comprises a holding element configured such that mechanical contact between the holding element and the first stop element or the second stop element limits the driving range of the upper distribution car or the driving range of the lower distribution car.

9. The elevator system of claim 8 wherein the holding element is configured to be movable between a release position and a stop position, wherein in the release position the driving range of the respective distribution car is not limited by the holding element, herein in the stop position the driving range of the respective distribution car is limited by the holding element.

10. The elevator system of claim 1 wherein the first and second shafts are parallel and adjoining one another.

11. The elevator system of claim 10 wherein the first and second shafts at least partially overlap in a vertical direction.

12. The elevator system of claim 1 wherein the first and second shafts at least partially overlap in a vertical direction.

13. The elevator system of claim 1 wherein the second shaft comprises an upper portion and a lower portion, wherein the upper portion comprises the upper shuttle level and a region vertically above the upper shuttle level, wherein the lower portion comprises the lower shuttle level and a region vertically below the lower shuttle level.

14. The elevator system of claim 13 wherein the upper portion and the lower portion have a same size, and/or wherein at least one of the upper shuttle level or the lower shuttle level is disposed in a vertical direction substantially in a center of the second shaft.

15. The elevator system of claim 1 wherein the upper and lower shuttle cars are fixedly coupled to one another at all times.

16. The elevator system of claim 1, wherein the at least at times the upper and lower shuttle cars are fixedly coupled to one another and are only movable vertically upward and vertically downward together are inhibited from moving independent from one another.

* * * * *